No. 706,206. Patented Aug. 5, 1902.
S. SZENTJANOSSY.
COOKING APPARATUS.
(Application filed Mar. 18, 1902.)
(No Model.)
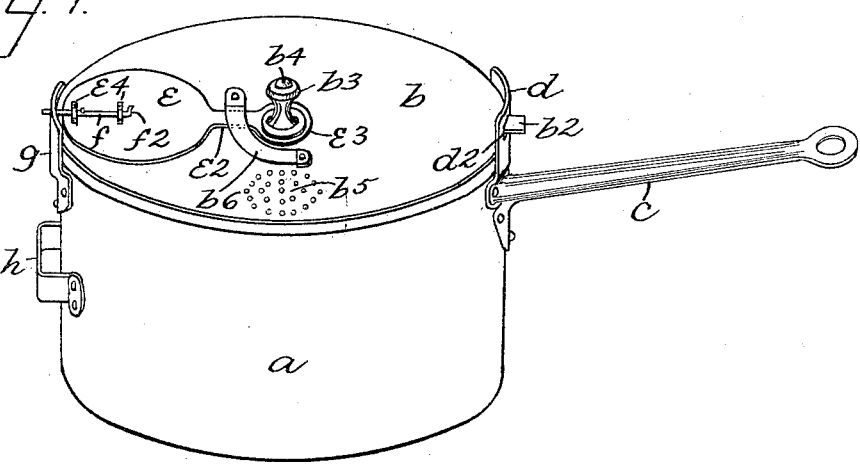
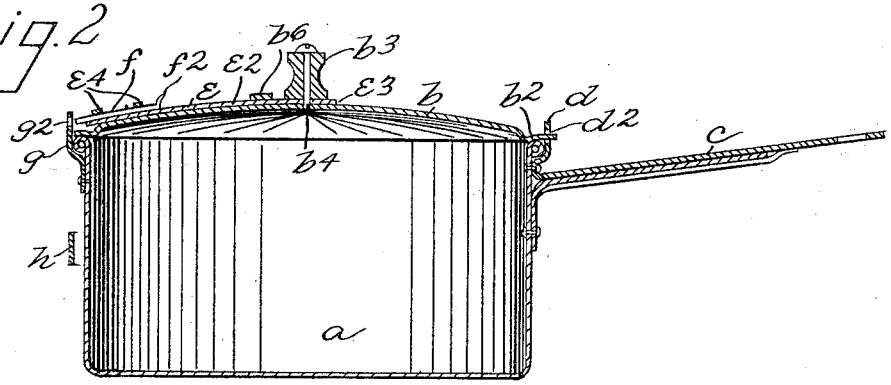
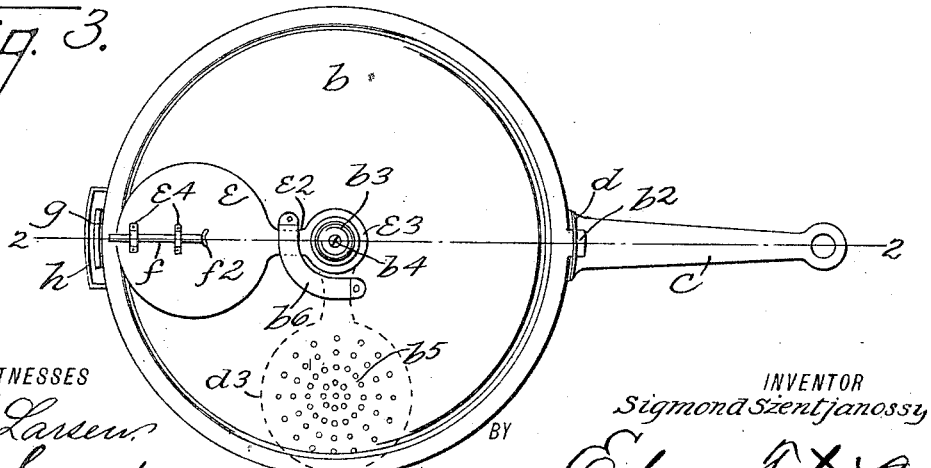
WITNESSES
INVENTOR
Sigmond Szentjanossy
BY Edgar Tate & Co
ATTORNEYS

UNITED STATES PATENT OFFICE.

SIGMOND SZENTJANOSSY, OF NEW YORK, N. Y.

COOKING APPARATUS.

SPECIFICATION forming part of Letters Patent No. 706,206, dated August 5, 1902.

Application filed March 18, 1902. Serial No. 98,855. (No model.)

*To all whom it may concern:*

Be it known that I, SIGMOND SZENTJANOSSY, a citizen of Hungary, residing at New York, county of New York, and State of New York, have invented a new and useful Cooking Utensil, of which the following is a specification, such as will enable those skilled in the art to which it appertains to make and use the same.

The object of this invention is to provide an improved stew-pot, stew-pan, or similar cooking utensil in which food may be cooked without removing the cover and in which the aroma of the food will not needlessly be evaporated or pass off in steam or vapor and from which the surplus of water or liquid may be poured without removing the cover; and with these and other ojects in view the invention consists in a cooking utensil of the class specified constructed as hereinafter described and claimed.

In the drawings forming part of this specification, in which the separate parts of my improvement are designated by the same reference characters in each of the views, Figure 1 is a perspective view of my improved cooking utensil; Fig. 2, a transverse vertical and central section thereof, and Fig. 3 a plan view thereof.

In the practice of my invention I provide a cooking utensil of the class specified comprising a suitable vessel $a$, having a cover $b$ and provided at one side with a handle $c$, and said vessel is also provided at the side thereof where the handle is attached with an upwardly-directed member $d$, which is preferably formed integrally with the handle or integrally with a supplemental piece which is secured to the vessel and with which the handle is connected, or said member $d$ may be formed or secured to the vessel $a$ in any desired manner. The member $d$ is also provided with an opening $d^2$, through which is passed a lug or projection $b^2$, with which the cover $b$ is provided.

The cover $b$ is provided centrally with a knob or handle $b^3$, which is held in place by a pin, screw, or similar device $b^4$, secured in the cover $b$, and said cover is also provided at one side with a plurality of perforations or openings $b^5$ and with a segmental keeper $b^6$, which is secured thereto adjacent to the knob or handle $b^3$. I also provide a disk plate or shield $e$, which is adapted to rest and move on the cover $b$, and this disk plate or shield is provided at one side with a neck $e^2$, having a circular head $e^3$, through which the pin $b^4$ passes, and the disk plate or shield $e$ is free to turn on said pin, and in one position thereof, and said disk plate or shield is intended to cover the perforations or openings $b^5$, as indicated in dotted lines at $d^3$.

The shield $e$ is provided at one side and opposite its pivotal connection with the cover $b$ with radially-arranged keepers $e^4$, in which is mounted a radially-movable pin $f$, provided at its inner end with a knob head or handle $f^2$, by which it may be moved radially on said shield, and secured to the side of the vessel $a$, directly opposite the handle $c$, is an upwardly-directed member $g$, similar to the member $d$, which is provided with a hole $g^2$, through which the pin $f$ is adapted to pass, and when the parts are in the position shown in Fig. 1 the shield $e$ is locked to the cover $b$ and said cover is locked to the vessel $a$, and in this position of the parts steam or vapor is free to pass in small quantities through the perforations or openings $b^5$. When the shield $e$ is in the position as shown in dotted lines in Fig. 3, the perforations or openings $b^5$ will be closed thereby and the steam or vapor, when the pressure is too great in the vessel $a$, will pass out from beneath said cover at the edges thereof, the said cover rising slightly to permit of this operation. The vessel $a$ is also preferably provided at one side and opposite the handle $c$ with a loop-shaped attachment $h$, by which it may be suspended from a suitable support when not in use, and as thus constructed it will be seen that the steam and vapor produced by the cooking of an article within the vessel $a$ will be to a considerable extent confined within said vessel, only enough thereof being allowed to pass out to prevent the pressure from becoming too great within said vessel, and when the parts are in position shown in full lines in the drawings the water or other liquid may be poured out through the perforations or openings $b^5$ in the cover $b$.

Having fully described my invention, what I claim as new, and desire to secure by Letters Patent, is—

A cooking utensil comprising a vessel having a cover provided at one side with perforations or openings and with a pivoted shield adapted to cover said openings, said vessel being also provided at its opposite sides with upwardly-directed members, and said cover being provided at one side with a lug or projection adapted to pass through one of said members, and said shield being provided with a radially-movable pin adapted to pass through the other of said members, substantially as shown and described.

In testimony whereof I have signed my name to this specification, in the presence of two subscribing witnesses, at New York, N.Y., March 10, 1902.

SIGMOND SZENTJANOSSY.

Witnesses:
A. B. BESSENYEY,
G. POLOMJI.